(12) United States Patent
Root

(10) Patent No.: US 8,867,691 B1
(45) Date of Patent: Oct. 21, 2014

(54) SEISMIC SAFE NUCLEAR POWER PLANT

(76) Inventor: Warren N. Root, Prescott, AZ (US)

(*) Notice: Subject to any disclaimer, the term of this patent is extended or adjusted under 35 U.S.C. 154(b) by 340 days.

(21) Appl. No.: 13/589,126

(22) Filed: Aug. 18, 2012

Related U.S. Application Data

(60) Provisional application No. 61/528,102, filed on Aug. 26, 2011.

(51) Int. Cl.
*G21C 9/00* (2006.01)

(52) U.S. Cl.
CPC .............. *G21C 9/00* (2013.01); *G21Y 2002/30* (2013.01)
USPC .......................................................... 376/277

(58) Field of Classification Search
CPC ............. G21D 1/00; G21D 1/02; G21D 1/04; G21D 3/00; G21D 3/04; G21D 3/05; G21Y 2002/20; G21Y 2002/203; G21Y 2002/206; G21Y 2002/207; G21Y 2002/30; G21Y 2002/302; G21Y 2002/303; G21Y 2002/50; G21Y 2004/30; G21Y 2004/301; G21Y 2004/504; G21C 9/00
USPC .......... 376/277, 283, 305, 461, 463, 909, 912
See application file for complete search history.

(56) References Cited

U.S. PATENT DOCUMENTS

| 3,599,589 A * | 8/1971 | Busey ........................... 114/264 |
| 3,794,849 A * | 2/1974 | Perry et al. .................... 307/147 |
| 7,007,620 B2 * | 3/2006 | Veazey .......................... 114/77 R |
| 2012/0024794 A1 * | 2/2012 | Fischmann ................... 210/665 |
| 2012/0236980 A1 * | 9/2012 | Redschlag .................... 376/298 |

* cited by examiner

*Primary Examiner* — Jack W Keith
*Assistant Examiner* — Marshall O'Connor
(74) *Attorney, Agent, or Firm* — Jerry Turner Sewell

(57) ABSTRACT

A system and method isolate a nuclear power plant from effects of seismic action. An artificial lake is formed as a depressed area in the ground surrounded by walls or banks to constrain a volume of water within the depressed area. The lake has a concrete reinforced bed. The lake is surrounded by a land-based support area. The lake is filled from a source of water in liquid communication with the lake. The source is controlled to release water into the lake to maintain the lake at a selected level. At least one vessel floats on the surface of the water. The vessel is connected to the walls or banks of the lake with a plurality of shock absorbers to dampen movement of the vessel. A nuclear power plant erected on the vessel includes at least one cooling tower that receives cooling water from the lake.

9 Claims, 8 Drawing Sheets

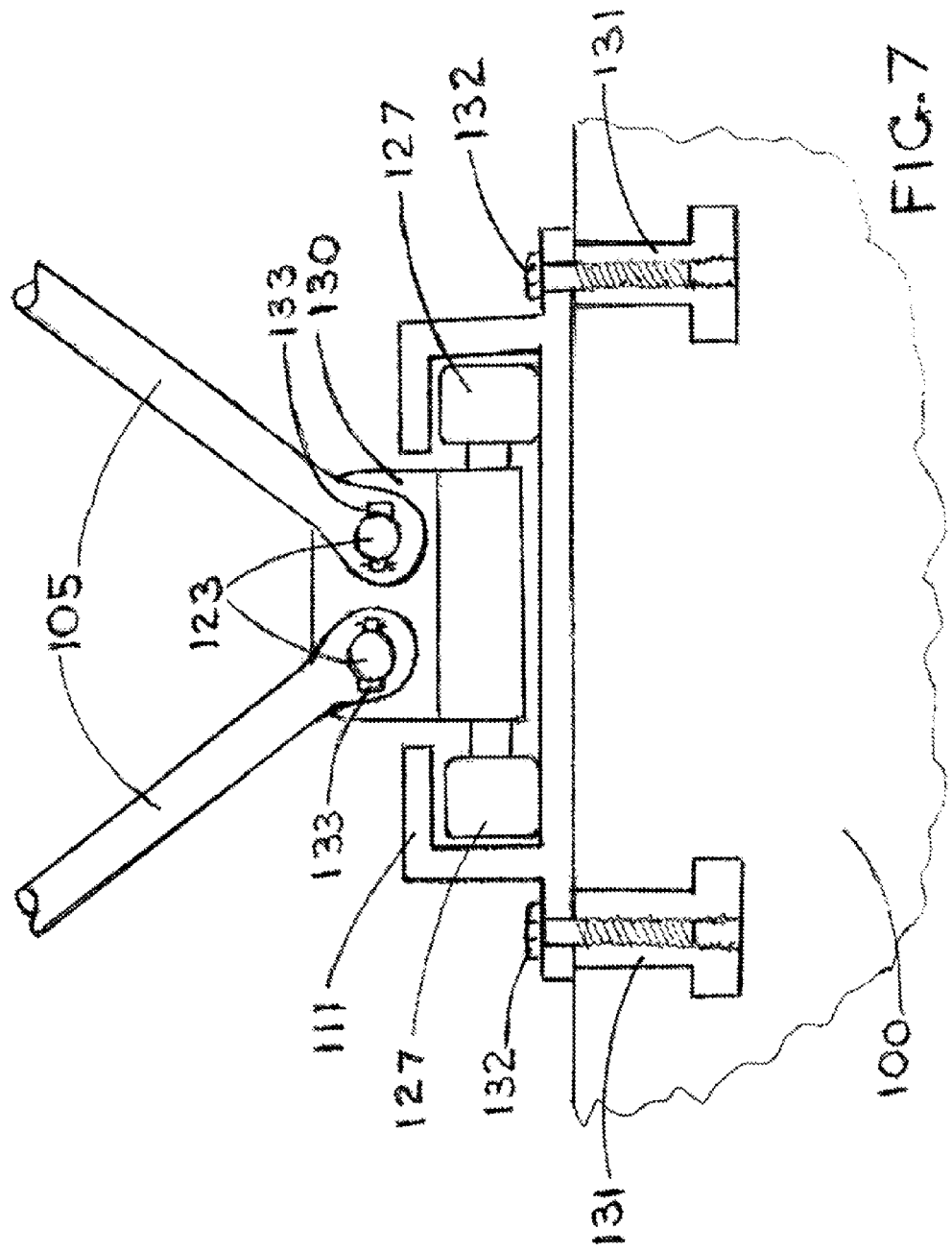

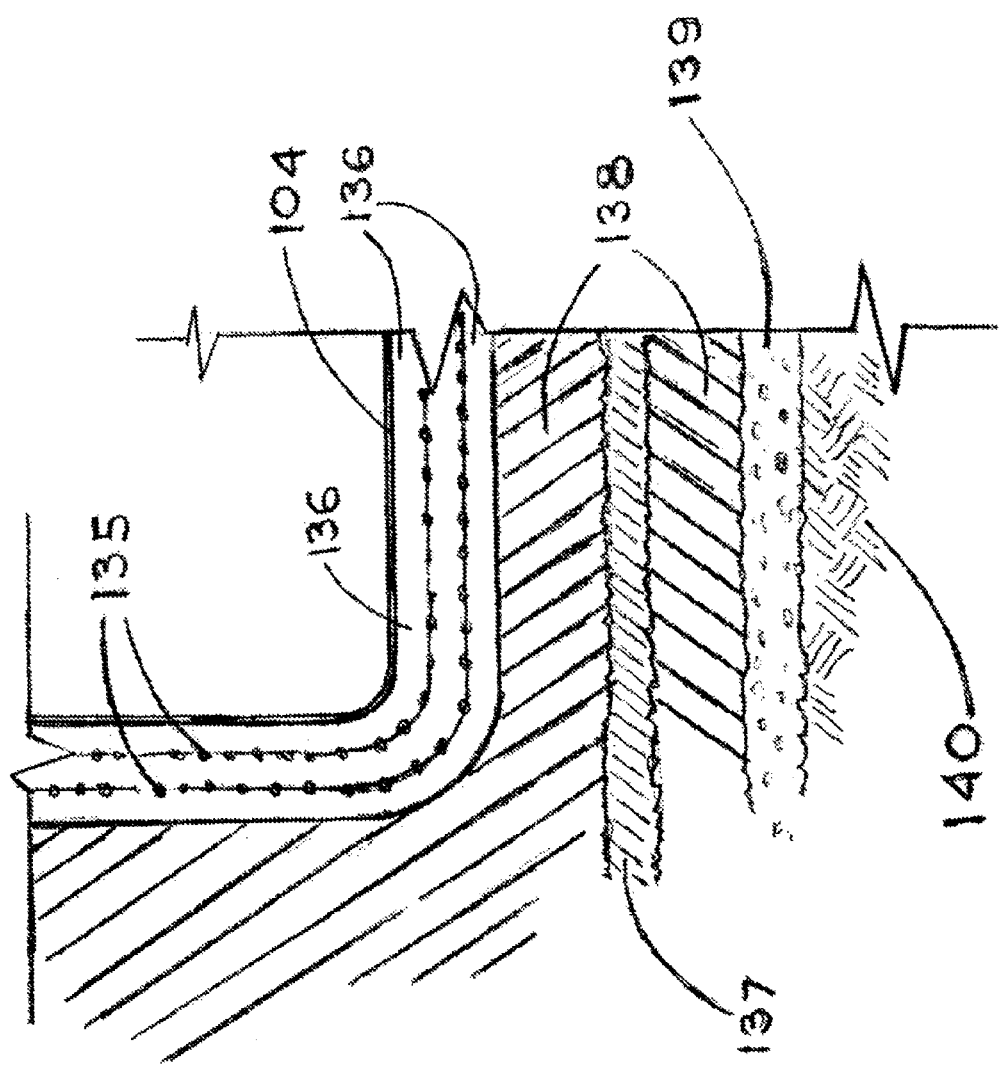

SEISMIC SAFE NUCLEAR POWER PLANT

RELATED APPLICATIONS

The present application claims the benefit of priority under 35 USC §119(e) to U.S. Provisional Application No. 61/528,102 filed on Aug. 26, 2011.

BACKGROUND OF THE INVENTION

1. Field of the Invention

The present invention is in the field of energy generation, and, more particularly, is in the field of protection of nuclear energy generation plants from the effects of seismic activity.

2. Description of the Related Art

Concerns are continually be expressed about the safety of nuclear power generating plants if and when an earthquake or other seismic activity occurs sufficiently close to one or more of the plants to cause substantial movement of the structures (housings, supports, interconnection pipes, etc.) within the stations. In particular, people are concerned about the release of radioactive materials in the event of a structural failure and are further concerned about the loss of cooling water to a reactor.

SUMMARY OF THE INVENTION

An aspect of embodiments in accordance with the present invention is a system and a method to isolate a nuclear power plant from effects of seismic action. An artificial lake is formed as a depressed area in the ground surrounded by walls or banks to constrain a volume of water within the depressed area. The lake has a concrete reinforced bed and is surrounded by a land-based support area. The lake is filled from a source of water in liquid communication with the lake. The source is controlled to release water into the lake to maintain the lake at a selected level. At least one vessel floats on the surface of the water. The vessel is connected to the walls or banks of the lake with a plurality of shock absorbers to dampen movement of the vessel. A nuclear power plant erected on the vessel includes at least one cooling tower that receives cooling water from the lake.

The system and method disclosed herein protect a nuclear power plant from a maximum seismic event through the use of water isolation, shock control and wave damping. The system and method include additional redundant systems to provide maximum protection during seismic activity. The nuclear power plant has full auto shut-down mode, with continuous safe reactor cooling maintained. Constructing a lake and securing a large steel power plant float in the lake creates an on-site cooling source and the controlled seismic protection for the reactor. Prior to the disclosed system and method, locations for nuclear power plants were selected by larger bodies of water for cooling. Such locations allow major damage to existing nuclear power plants by tsunamis. The disclosed system and method reduce or eliminate the danger from a tsunami and use liquid separation to isolate the ground seismic waves from direct contact to the reactor.

BRIEF DESCRIPTION OF THE DRAWINGS

Embodiments in accordance with aspects of the present invention are described below in connection with the attached drawings in which:

FIG. 7 illustrates a cross-sectional elevational view of the roller assembly traveler attached to shock absorber and mounted to the lake side;

FIG. 10 illustrates an enlarged cross-sectional view of a portion of the concrete bed showing the rebar matrix, the backfill material and the natural rock base.

DETAILED DESCRIPTION OF PREFERRED EMBODIMENTS

The seismic safe nuclear power plant is disclosed herein with respect to exemplary embodiments of a system and a method. The embodiments are disclosed for illustration of the system and the method and are not limiting except as defined in the appended claims.

Figure 1:
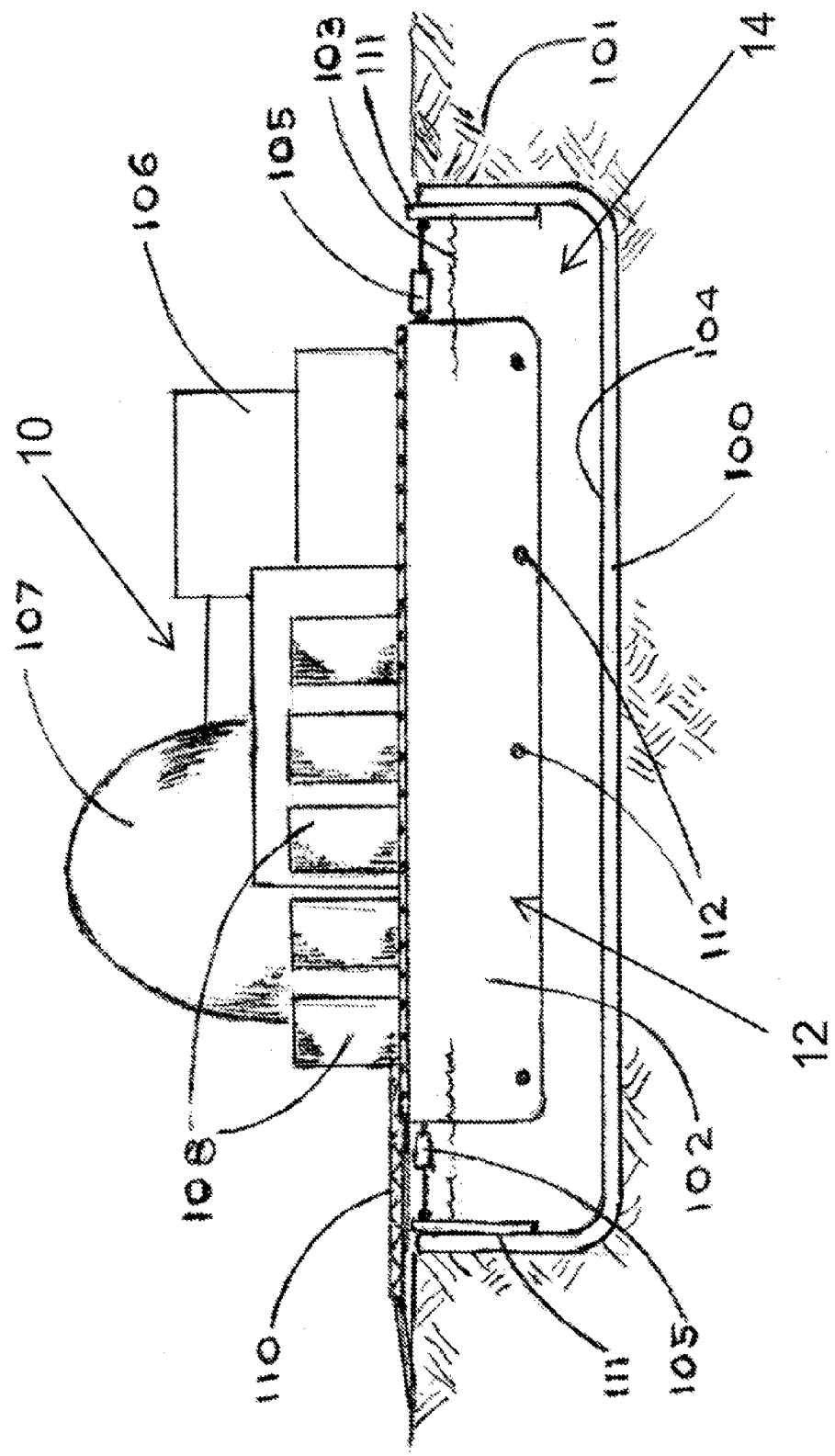
FIG. 1 illustrates a cross-sectional elevational view of the nuclear power plant erected on a floating vessel in a lake.
Figure 2:
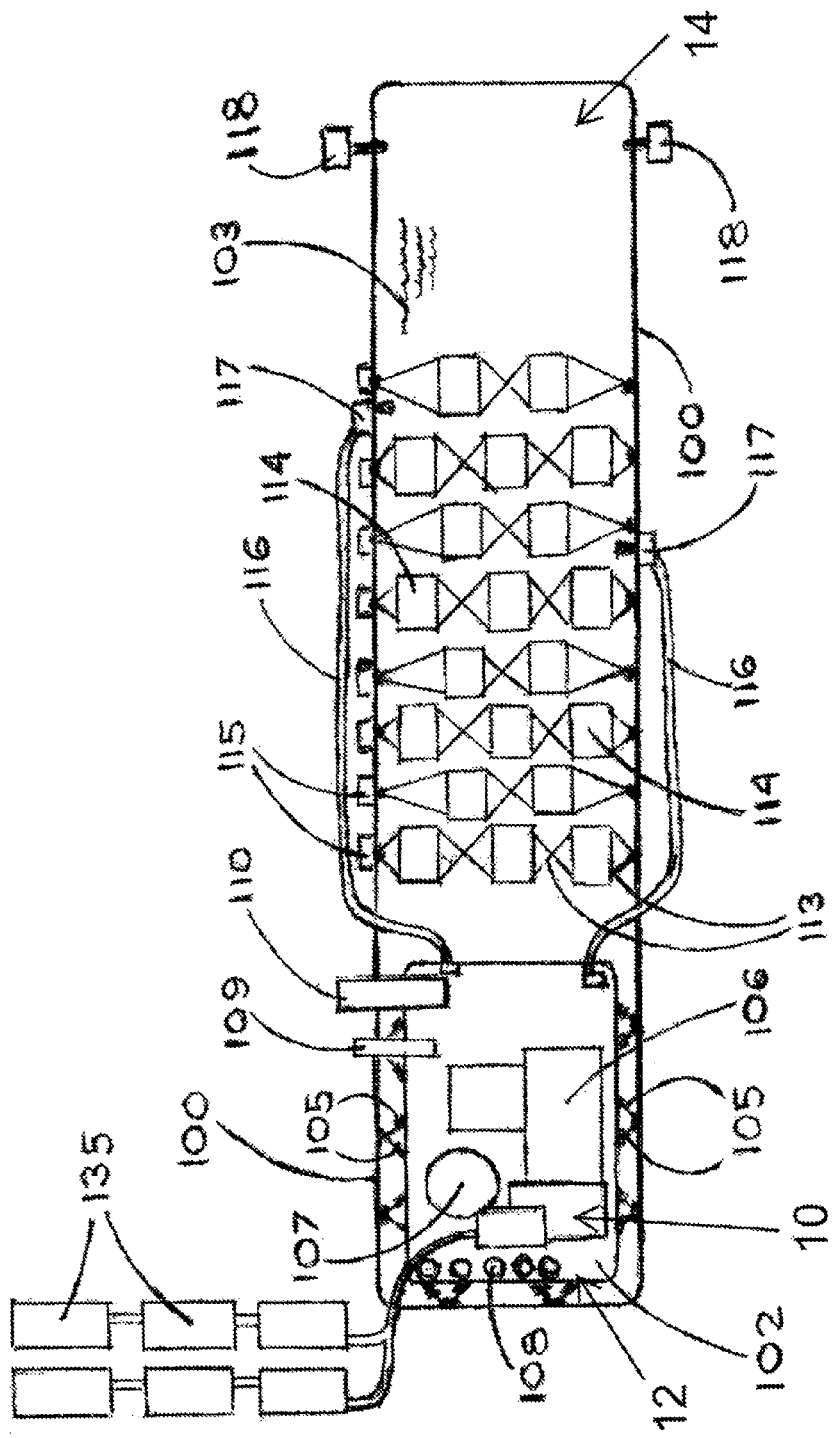
FIG. 2 illustrates a plan view of the nuclear power plant of FIG. 1.

FIG. 1 illustrates a cross-sectional elevational view of the nuclear power plant 10 erected on a vessel 12 floating in a lake 14. FIG. 2 illustrates a top plan view of the nuclear power plant, the vessel and the lake.

The lake 14 is defined by a concrete reinforced lake containment wall (lake wall) 100 formed within a special soil compaction area 101. The lake wall is lined with a triple flexible lake bed liner 104. The containment structure of the lake supports and contains a body of water 103.

The nuclear power plant 10 comprises a power plant building 106 proximate to a nuclear reactor dome 107. The plant further includes a plurality of cooling towers 108.

The nuclear power plant 10 is positioned on the vessel 12 and thus floats on the lake 14. The hull 102 of the vessel is secured to the lake wall 100 via a plurality of shock absorbers 105. Access to the vessel and thus to the nuclear power plant is provided by a main access bridge 110, which accommodates vehicles. Additional access is provided by a foot bridge 109 (shown in FIG. 2).

The shock absorbers 105 are movable secured to the lake wall 100 by respective shock absorber vertical guide tracks 111. The engagement of the shock absorbers with the vertical guide tracks allow the shock absorbers to move up and down with respect to the lake wall while maintaining the lateral position of the vessel 12 with respect to the lake wall. Accordingly, the shock absorbers accommodate changes in the water level of the lake 14 or other causes of vertical movement of the vessel with respect to the lake wall.

As further illustrated in FIG. 1, the vessel 12 includes a plurality of water intakes 112 that are coupled by pipes (not shown) and pumps (not shown) to the cooling towers 108 to provide cooling water. In the illustrated embodiment, four separate water intakes are provided for safety. Any or all of the intakes can be automatically or manually enabled to provide cooling during maximum power generation.

The nuclear power plant 10 is constructed with a safety factor that will withstand a major seismic event. The complete nuclear power plant 10 is isolated from direct soil activity during any seismic event by the water 103. Additional safety includes redundancy in safety controls and on site replacement components in case a component fails during seismic conditions. In addition, the nuclear power plant includes at least three redundant on-site power generating systems to provide electrical power for the control systems within the plant. Preferably, the nuclear power plant includes a fuel reserve sufficient to enable the on-side power generating systems to operate for at least three weeks.

Figure 4:
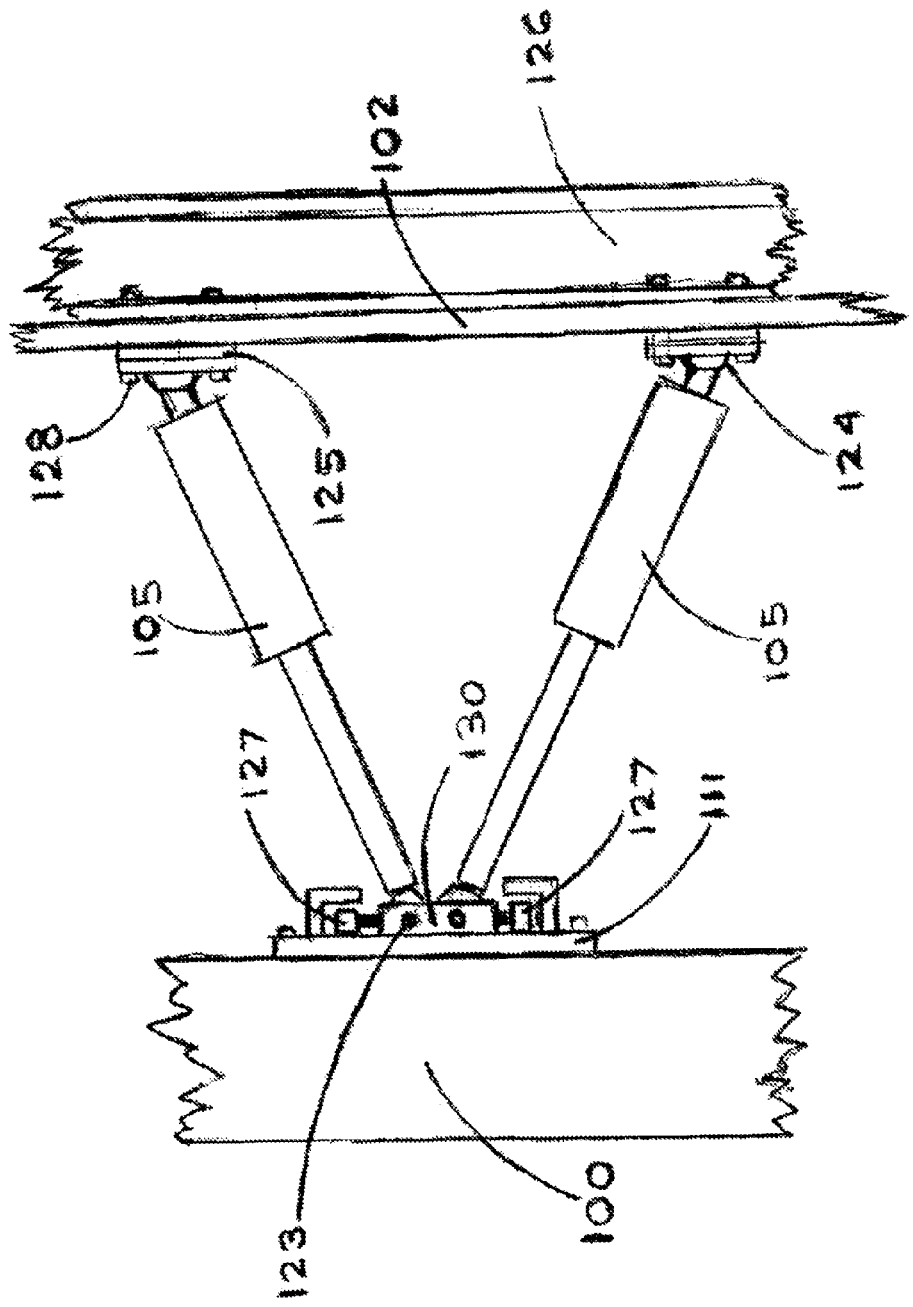
FIG. 4 illustrates an enlarged plan view of a pair of shock absorbers connected the vessel to the wall or bank surrounding the lake.
Figure 6:
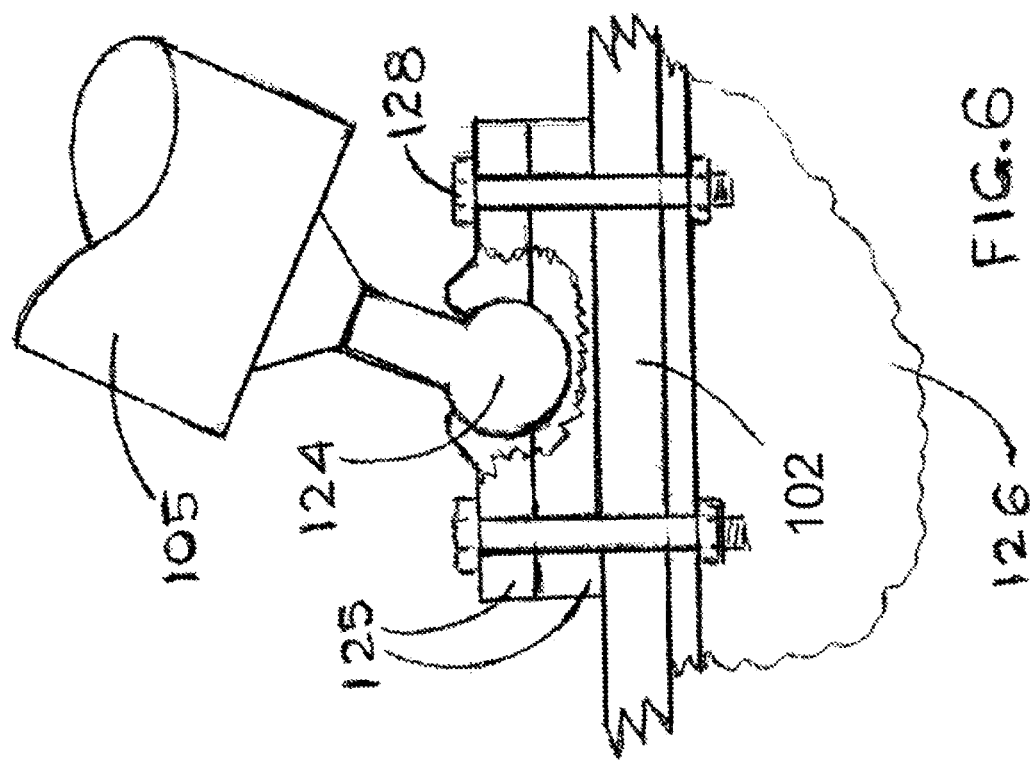
FIG. 6 illustrates an enlarged partially broken away view of the shock absorber showing the ball and socket joint at the connection with the vessel.

Maximum safety factor is produced by constructing the lake 14 shown in FIGS. 1 and 2 and floating the complete nuclear power plant 10 on the vessel 14. As illustrated in FIGS. 1, 4 and 6, stability is added to the floating nuclear power station on three sides with the giant shock absorbers 105 to the vertical guide track 111 fastened to the lake edge.

As shown in FIG. 2, the vessel 12 is positioned generally at one end of the elongated lake 14. Excessive movement of the water 103 in the extended open portion of the lake is suppressed with a surface wave damping system comprising a large matrix of floating hollow concrete wave dampeners 114 of various sizes, which are arranged in a staggered pattern for maximum wave control. The pattern of dampeners is formed by cross connecting the corners of the dampeners with cables or chains 113 to interconnect the floating dampeners. A plurality of winches 115 are coupled to the cables or chains and are positioned at the lake edge to control tension on the wave damping matrix automatically as the lake 103 reacts to seismic event stabilizing lake surface. The automatic tensioning action of the winches with respect to the dampener matrix operates to control wave action on the surface of the lake during a seismic event.

As further shown in FIG. 2, pumps (not shown) return the water to the lake 14 from the nuclear power plant 10 via a plurality of return cooling lines 116, which are connected to respective spray units 117. The spray units advantageously comprise a plurality of spray heads to disburse the water over a large surface area and to provide additional cooling of the water before returning the water to the lake to mix with the lake water 103.

As shown in FIG. 1, preparing the lake site requires oversized excavation to allow the back fill 101 of several different compacted layers of soil compounds, which are shown in FIG. 10. This reduces direct seismic activity to the reinforced concrete lake liner 100. This method insures minimum seismic wave shock to concrete reinforced lake containment 100.

Figure 5:
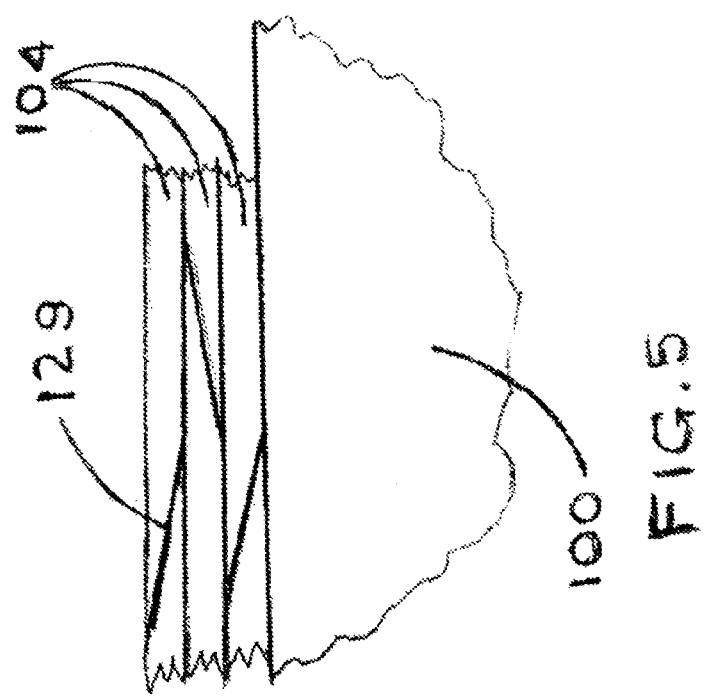
FIG. 5 illustrates an enlarged cross-sectional view of the triple-ply liner that lines the lake.

For additional protection, the concrete reinforced lake containment 100 includes the flexible triple-membrane liner 104 inside that maintains lake integrity in the event the concrete reinforced lake containment 100 should fracture during a seismic activity. As illustrated in FIG. 5, the triple liner 104 is laid on the lake wall 100 with each layer laid individually with the bonded seams 129 diagonally placed in respect to each layer. This laying procedure provides maximum protection if the reinforced concrete lake wall 100 fractures.

The large body of water 103 in the lake 14 creates a natural heat sink to cool the reactor. In the event the lake loses all the water 103, the floating steel nuclear power plant 10 can continue full operation with the vessel 12 resting on the concrete reinforced lake containment wall 100.

Figure 3:
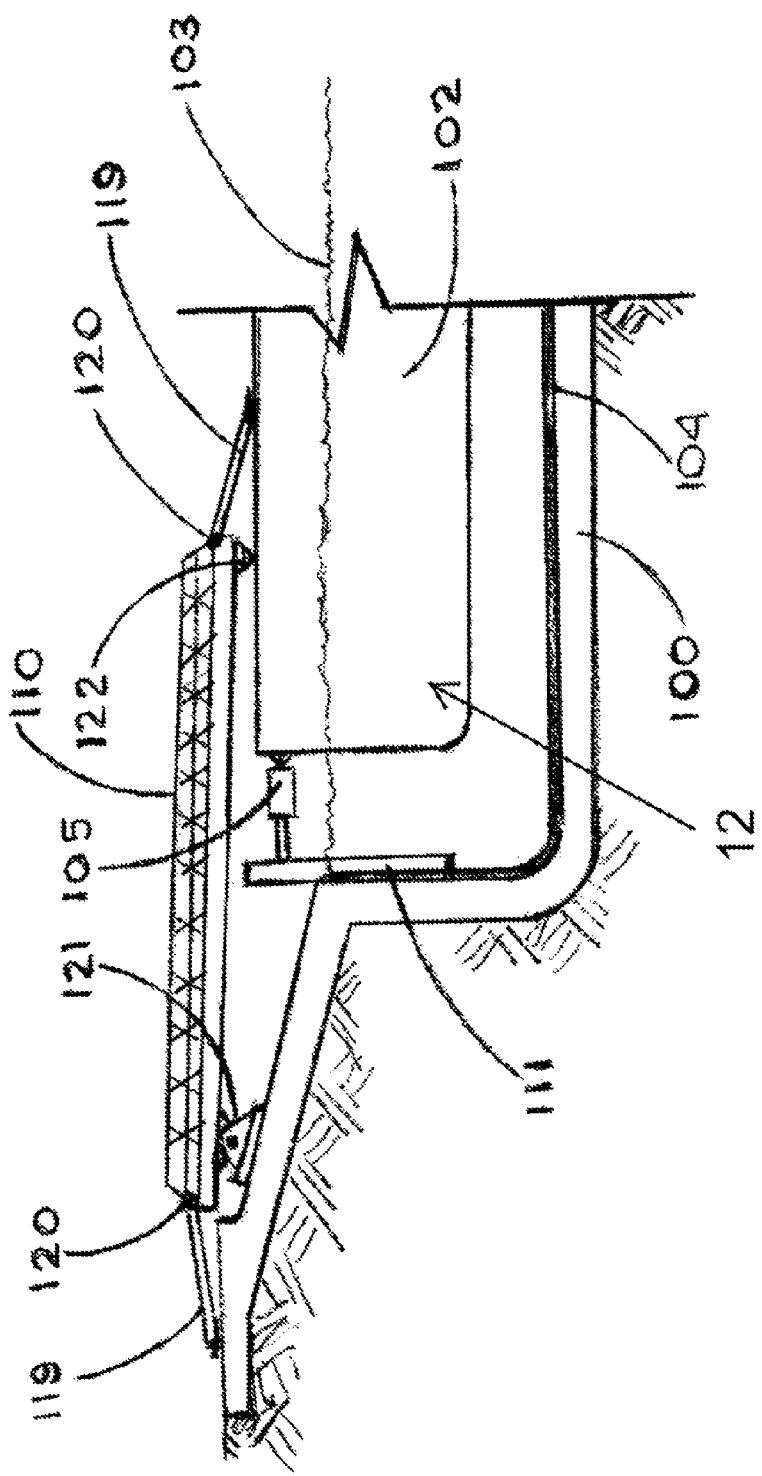
FIG. 3 illustrates an enlarged cross-sectional elevational view of the nuclear power plant of FIG. 1 to show the bridge and shock absorber that connect the vessel to the wall or bank surrounding the lake.
Figure 9:
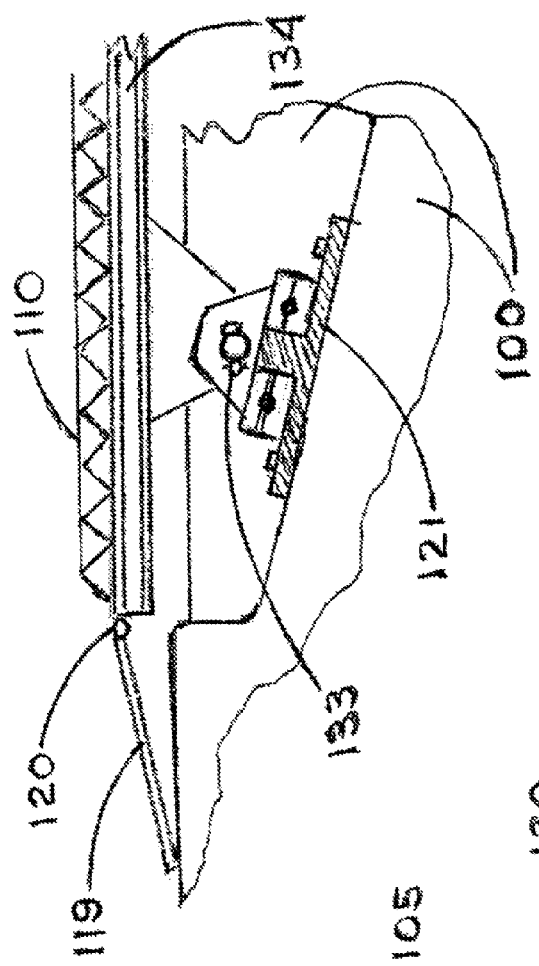
FIG. 9 illustrates an enlarged view of a portion of the bridge of FIG. 3.

As shown in FIGS. 2, 3 and 9, full accessibility remains due to design of both bridges 109 and 110. Should the bridges 109, 110 have damage during seismic activity, two back-up bridges and the necessary equipment are stored on site for immediate easy replacement.

Although not shown in the drawings, the concrete reinforced lake containment wall 100 includes a plurality of areas that are further reinforced with heavy steel plates. The heavy steel plates are placed on the lake bed at precise locations to be determined by size and shape of floating power plant 10. The steel reinforcing plates at the selected locations are used to support construction equipment and provide bearing support points for work on the floating nuclear power plant during construction and maintenance. After construction of the nuclear power plant 10 is completed and before the lake is filled, the triple-membrane 104 liner is laid in place. After all construction equipment is removed, the remaining steel support areas are covered with triple-membrane liners 104 by divers and are bonded to the existing liner with underwater adhesive.

As shown in FIGS. 1 and 2, the floating nuclear power plant is held on three sides by the large shock absorbers 105, which are attached to respective three sides of the lake wall 100. The shock absorbers are attached as shown in FIG. 4. The vertical tracks guide the shock absorbers 105 during the raising and lowering of the level of the water 103.

FIGS. 4, 6, 7 and 8 illustrate the attachment of the shock absorbers 105. As shown in FIG. 4, the vertical guide track 111 is mounted to the side of the lake wall 100.

FIG. 6 illustrates an enlarged partially broken away view of the shock absorber 105 and further showing the ball and socket joint at the connection with the hull 102 of the vessel 12. The ball and socket joint comprises a ball 124 at the end of the shock absorber, which is secured within a cavity formed by two plates 125 that form a ball joint mount. The ball joint mount is secured to a linear I-beam 126 on the inside of the hull 126 of the vessel. The I-beam is provided as a reinforcement between bulkheads inside the vessel. The I-beam provides a secure mounting base for the ball and socket joint. The I-beam also dissipates energy from the shock absorber mount during movement caused by a seismic event or other force.

Figure 8:
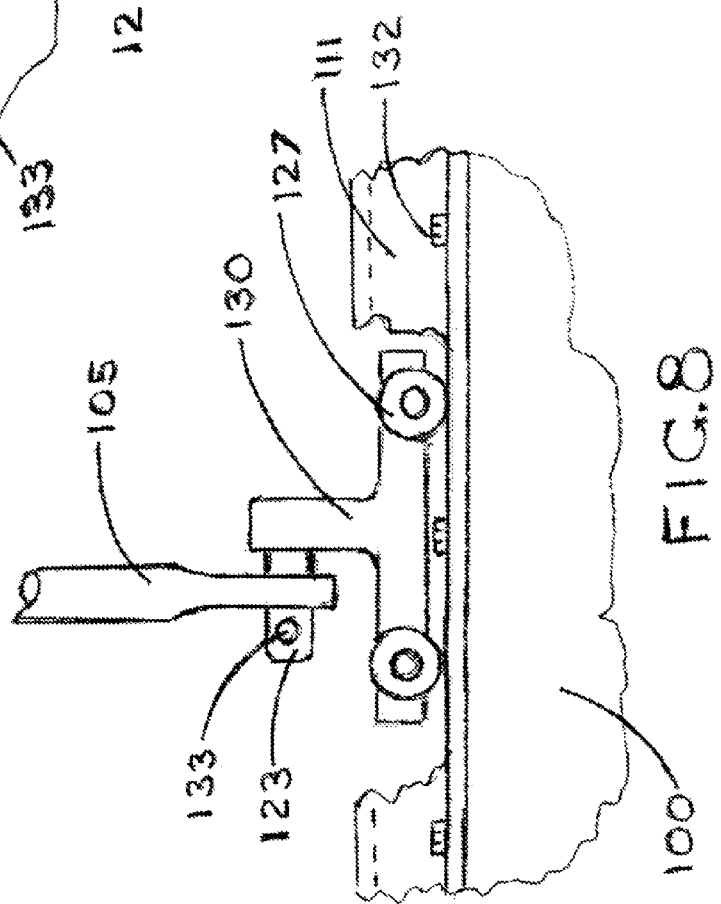
FIG. 8 illustrates a partially broken away elevational view of the roller assembly traveler of FIG. 7 looking orthogonal to the view in FIG. 7.

As shown in FIGS. 7 and 8, a roller assembly traveler 130 is pivotally attached to respective ends of a pair of shock absorbers 105 via respective shock absorber mounting posts 123. The shock absorbers are secured to the mounting posts by removable safety lock pins 133. The roller assembly traveler includes a pair of horizontally opposed guide rollers 127 that engage the vertical guide track so that the lateral position of the roller assembly traveler is maintained as the traveler moves vertically within the guide track. As further shown in FIG. 7, the vertical guide track is secured to the containment wall 100 via a plurality of mounting bolts 132 screwed into a plurality of threaded inserts 131 that are embedded in the containment wall.

As briefly discussed above, vehicle access to the floating power plant on the vessel 12 is provided by the main bridge 110. The second bridge 109 supports foot traffic. As shown in FIGS. 3 and 9, the flexible pre-tensioned bridges are supported and held in place by bridge rollers 122 (FIG. 3) and bidirectional rotary pivots 121 that allow the bridges to accommodate changes in the level of the water 103 and other motion (e.g., seismic motion). As illustrated in FIG. 9 for the main bridge, the bridge comprises a generally horizontal structure 134 that is coupled at each end to a respective hinged sliding plate 119 by a respective hinge 120. The hinged sliding plate accommodates changes in the angular position of the bridge in response to relative vertical movement of the vessel with respect to the lake wall 100. As shown in FIG. 9, the bridges include quick removal safety lock pins 133 for change-out in an emergency.

All power lines, water, sewer and any other necessary connections to the floating nuclear power plant 10 are constructed above ground with flexure and slack to accommodate seismic motion and lake level change.

The complete floating nuclear power plant 10 is equipped with every safety system required to operate the most modern nuclear plant; including an emergency auto start generating system and 30 days of fuel supply with full control during emergencies or shut down mode.

If the lake wall 100 breaches, a plurality of water-filled interconnected bladder tanks 135, positioned on shore proximate to the vessel 12, are able to supply water to replace the loss of the lake water 103. When an emergency occurs, the bladder tanks are automatically switched to provide water to the cooling towers 108 in order to maintain cooling to reactor.

The bladder tanks 135 are readily filled by trucks or by a quick-lay land water line to maintain continuous operation when necessary in an emergency. Each of the bladder tanks includes internal air-filled baffles to provide internal motion wave damping during a seismic event.

As further shown in FIG. 2, the lake level is controlled by two separate automatic filling units that are supplied from respective independent water supply sources. The filling units maintain an ample water supply at all times by automatically adding water to the lake 14 as the water level decreases because of evaporation.

FIG. 10 illustrates an enlarged cross-sectional view of the concrete reinforced lake containment wall 100, which includes a dual rebar matrix 135 in the preferred embodiment. The dual rebar matrix is surrounded by a concrete layer 136. In the illustrated embodiment, the concrete layer comprises hi-tensile concrete having a thickness of 4 feet. As discussed above, the concrete and rebar lake containment wall is surrounded by and supported by compacted back fill 101. The back fill advantageously comprises a substrate having a layer 137 of 2-inch crushed rock that is compacted to a thickness of approximately 2 feet. The crushed rock layer 137 is sandwiched between two layers 138 of sand and crushed rock that are each compacted to a thickness of approximately 6 feet. The lowermost layer 138 of sand and crushed rock lies on a layer 139 of sand, gravel and 2-inch crushed rock with cement mix. The layer 139 is wet-sprayed in 6-inch layers and is compacted to form an overall layer having a thickness of approximately 4 feet. The various layers are formed on an existing natural base 140.

The embodiment illustrated herein protects the nuclear power plant 10 from a seismic event. The actual size and specific physical details of the nuclear power plant vary with power requirements and the geographical location of the power plant. For example, in an exemplary embodiment, a basic size for the vessel 12 that supports the floating nuclear plant is 300 feet by 600 feet. For example, a 300-foot by 600-foot vessel having a draft of 15 feet will support an 85,000-ton nuclear power plant. The surface area and the depth of the lake 14 are determined according to the specific requirements of the power generation necessary for each plant.

As various changes could be made in the above constructions without departing from the scope of the invention, it is intended that all the matter contained in the above description or shown in the accompanying drawings shall be interpreted as illustrative and not in a limiting sense.

What is claimed is:

1. A system for isolating a nuclear power plant from effects of seismic action, comprising:
   an artificial lake formed as a depressed area in the ground surrounded by walls or banks to constrain a volume of water within the depressed area, the lake having a concrete reinforced bed, the walls or banks of the lake surrounded by a land-based support area;
   at least one source of water in liquid communication with the volume of water in the lake, the at least one source controlled to selectively release water into the lake to maintain the surface of the water in the lake at a selected level;
   at least one vessel floating on the surface of the volume of water;
   a plurality of shock absorbers connected to the at least one vessel and connected to the walls or banks, the shock absorbers dampening movement of the vessel with respect to the walls or banks; and
   a nuclear power plant constructed on the at least one vessel, the nuclear power plant including at least one cooling tower that receives cooling water from the lake and that releases heated water into the lake.

2. The system as defined in claim 1, wherein the concrete bed rests on a plurality of layers of fill material.

3. The system as defined in claim 1, wherein a flexible multi-layer membrane liner is positioned over the reinforced concrete bed to constrain water within the lake if the concrete bed is fractured.

4. The system as defined in claim 1, further comprising an array of flexible water-filled bladders in selectable liquid communication with the at least one cooling tower, the water-filled bladders automatically controlled to provide water to the at least one cooling tower in the event of loss of water from the lake.

5. The system as defined in claim 4, wherein the water-filled bladders are refillable as water from the water-filled bladders is provided to the at least one cooling tower.

6. The system as defined in claim 1, wherein all connections to and from the nuclear power plant are flexible such that all connections are maintained even if the water level of the lake changes significantly.

7. The system as defined in claim 1, further comprising an articulated bridge between the vessel and the banks or walls of the lake to provide continuous access from the banks or walls of the lake to the nuclear plant on the vessel.

8. The system as defined in claim 7, further comprising a replacement bridge and equipment for moving the replacement bridge in the event of loss of the articulated bridge.

9. The method as defined in claim 1, wherein the at least one source of water comprises at least two independent sources of water.

* * * * *